June 14, 1932. W. AMOSS 1,863,318
METHOD OF CALCINING GYPSUM
Filed Jan. 13, 1930
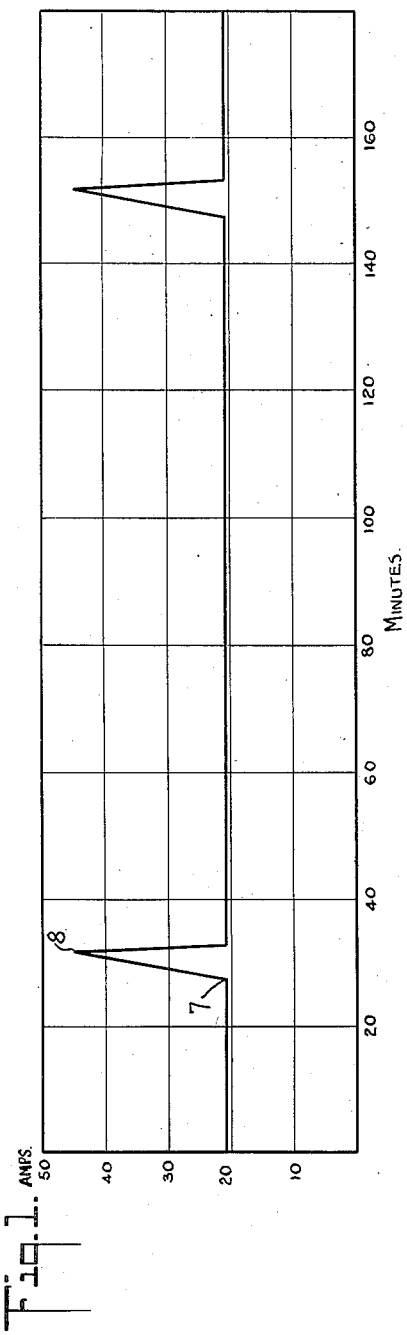
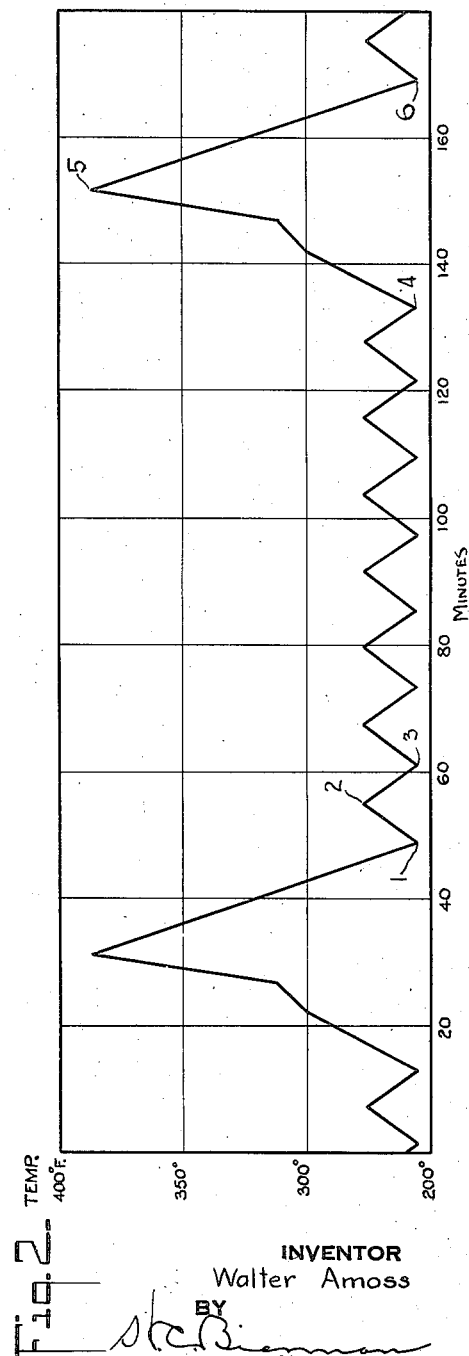
INVENTOR
Walter Amoss
BY
ATTORNEY Patented June 14, 1932

1,863,318

UNITED STATES PATENT OFFICE

WALTER AMOSS, OF BUFFALO, NEW YORK, ASSIGNOR TO STRUCTURAL GYPSUM CORPORATION, OF LINDEN, NEW JERSEY, A CORPORATION OF DELAWARE

METHOD OF CALCINING GYPSUM

Application filed January 13, 1930. Serial No. 420,469.

The present invention relates to a method of calcining gypsum and more particularly to a method of determining the desired stopping point in progressive calcination to produce a calcined or dehydrated product having the required amount of water.

In the calcination of gypsum, the operation is carried out by progressively charging a mass thereof into a kettle heated by any desired means to drive off the water while the mass is continuously agitated. Ordinarily either of two forms of dehydrated gypsum may be produced, one being plaster of Paris or a hemihydrate of the formula

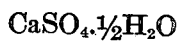

the usual product, and the other being an anhydrous $CaSO_4$ formed by complete dehydration. As gypsum in its ordinary state contains two molecules of water of crystallization, it is extremely desirable to operate the calcining kettles in such a manner that an accurate stopping place may be determined in order that the maximum amount of hemihydrate and minimum amount of anhydrous or fully hydrated gypsum can be produced in a batch. It will be obvious that unless an accurate control is maintained, some of the fully hydrated gypsum may not be dehydrated at all and on the other hand, some of it may be completely dehydrated with the result that a non-uniform product is produced.

The methods heretofore in use have involved locating a thermometer at a definite point in the calcining kettle to indicate the temperature of the batch but it will be readily apparent that when calcining a charge of gypsum which often reaches as high as 15 tons, the temperature throughout the mass is not uniform and hence a thermometer located at any point is often misleading as to the true temperature.

It is the object of this invention to determine a desired stopping point in progressive calcination of gypsum and the like materials, which is dependent upon a uniform condition throughout the mass.

In one aspect of the invention I may drive the stirring mechanism by electric energy, the current therefor passing through an ammeter. As the gypsum dehydrates, it first boils and then begins to settle. As this settling proceeds the dehydrated product becomes more and more dense, offering more resistance to the stirring mechanism and requiring more current in the motor. I have found that an ammeter may be used to indicate the condition of dehydration within the kettle to a remarkably accurate degree. The invention, therefore, contemplates the control of dehydration by determining the resistance to stirring as indicated by an ammeter or the like.

In the drawing,—

Fig. 1 diagrammatically indicates the curve of an ammeter through a cycle of calcinating, and Fig. 2 diagrammatically represents the temperature curve over the same cycle.

Referring now in detail to the chart shown in Fig. 2, the filling of a kettle is begun at the point indicated at 1, a portion of a charge only being let in until the temperature has reached approximately to the point 2. At that point an added charge is let into the kettle and upon stirring the temperature drops to the point 3. This cycle is repeated with continued stirring until the point 4 is reached, at which time the kettle contains substantially its entire charge of gypsum to be dehydrated. For a particular gypsum it has been found that a temperature of approximately 390° F. is the ideal temperature for the production of hemihydrate, although if the kettle does not reach this temperature or a higher temperature is produced, the charge contains insufficiently dehydrated gypsum in the one case or anhydrous gypsum in the other. This desirable temperature is indicated at the point 5. When the proper amount of dehydration has taken place, the entire charge is dumped which brings the temperature down to the point 6, and the cycle is repeated. As above set forth, it is extremely difficult, if not impossible, to regulate the degree of dehydration by temperature indicators for the reason that the temperature in any one point is not the true temperature of the mass. This is recognized by the fact that the skilled calcining kettle operator relies principally upon the appearance of the calcining mass to tell when to dump the charge. This is an extremely inaccurate method of determining the point at which calcination should cease, due to the fact that the atmosphere above the calcining mass is filled with steam and entrained calcined gypsum and it is nothing more than a rough guess.

All calcining kettles contain some kind of a mechanism for stirring the same, which usually consists of a vertical shaft having paddles or arms thereon and which is continuously rotated within the kettle to keep the mass in constant agitation. As calcination progresses the water of crystallization is removed from the gypsum and the mass actually boils. While the mass is boiling the resistance to stirring is at a minimum but resistance increases as dehydration approaches the desired point.

Fig. 1 illustrates diagramatically the reading on an ammeter in circuit with an electrically driven stirring mechanism. It will be seen that at the desired point where the hemihydrate is produced, the amperage or load begins to rise. This is indicated at point 7. It has been found that when the calcining mass contains the maximum amount of hemihydrate, the amperage rises abruptly to the point 8, and at that time the charge should be dumped.

Analysis has shown that the actual calcination and dehydration condition within the kettle is much more accurately indicated by the load on the stirring motor than by visual inspection of the mass or by temperature indicators.

As above set forth, the amperage directly reflects the degree to which calcination has taken place.

It will be perfectly obvious that by suitable electric mechanism well known in the art, it will be possible to automatically dump the charge when the amperage has reached a predetermined figure and that this figure may be adjusted to, and be determined by, the proportion of water which it is desired to retain in the charge.

While I have indicated herein a specific embodiment of the invention, yet obviously I do not wish to be limited thereto, but the invention is to be construed broadly and restricted only by the scope of the claims.

I claim:—

1. A method of calcining gypsum which comprises charging a mass thereof into a kettle, continuously stirring the same by means of an electrically driven device, passing the current therefor through an ammeter, continuously heating the material until the amperage rises to a predetermined figure due to the increased resistance to stirring and then dumping the charge.

2. A method of calcining gypsum which comprises charging a mass thereof into a kettle, continuously stirring the same by means of an electrically driven device, passing the current therefor through an ammeter, continuously heating the material until the amperage rises to a predetermined figure due to the increased resistance to stirring and then automatically dumping the charge.

3. A method of calcining gypsum which comprises charging a mass thereof into a kettle, continuously stirring the same by means of an electrically driven device, passing the current therefor through an ammeter, continuously heating the material until the ammeter records an abrupt increase of stirring resistance, and then dumping the charge.

4. A method of calcining gypsum which comprises charging a mass thereof into a kettle, continuously stirring the same by means of an electrically driven device, passing the current therefor through an ammeter, continuously heating the material until the ammeter indicates an abrupt increase in current consumption, and then dumping the charge.

In testimony whereof, I have hereunto subscribed my name this 10th day of January, 1930.

WALTER AMOSS.